United States Patent
Zhang et al.

(10) Patent No.: US 11,843,481 B2
(45) Date of Patent: Dec. 12, 2023

(54) CHANNEL ESTIMATION METHOD AND APPARATUS

(71) Applicant: Huawei Technologies Co., Ltd., Guangdong (CN)

(72) Inventors: Ying Zhang, Shanghai (CN); Weihua Wang, Shanghai (CN); Chunhui Le, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/716,502

(22) Filed: Apr. 8, 2022

(65) Prior Publication Data
US 2022/0231887 A1 Jul. 21, 2022

Related U.S. Application Data

(63) Continuation of application No. PCT/CN2019/110260, filed on Oct. 10, 2019.

(51) Int. Cl.
*H04L 25/02* (2006.01)

(52) U.S. Cl.
CPC ...... *H04L 25/0224* (2013.01); *H04L 25/0242* (2013.01)

(58) Field of Classification Search
CPC .............. H04L 25/0224; H04L 25/0242
See application file for complete search history.

(56) References Cited

U.S. PATENT DOCUMENTS

| 2003/0081574 A1* | 5/2003 | Moon | H04B 7/0613 370/334 |
| 2011/0141982 A1* | 6/2011 | Zhang | H04L 27/2613 370/329 |

(Continued)

FOREIGN PATENT DOCUMENTS

| CN | 102075220 B | 10/2013 |
| CN | 103392365 A | 11/2013 |

(Continued)

OTHER PUBLICATIONS

G.G Raleigh et al: "Multivariate modulation and coding for wireless communication",IEEE Journal on Selected Areas in Communications, May 1, 1999 (May 1, 1999), pp. 851-866, XP055661821.

(Continued)

*Primary Examiner* — Zhiren Qin
(74) *Attorney, Agent, or Firm* — WOMBLE BOND DICKINSON (US) LLP

(57) ABSTRACT

This application discloses a channel estimation method and apparatus. When time-domain channel estimation is performed on a first slot, the first slot and at least one second slot are first determined. The first slot and each second slot form continuous slots. Then, a first signal corresponding to the first slot and a second signal corresponding to each second slot are obtained, and a time-domain channel estimate for the first slot is determined based on the first signal and each second signal. In embodiments of this application, when a time-domain channel estimate for a specific slot is determined, time-domain channel estimation is performed by using time-domain correlation of channels in combination with signals of a plurality of slots, so as to obtain a more accurate channel estimation result, thereby improving baseband demodulation performance.

20 Claims, 8 Drawing Sheets

(56) References Cited

U.S. PATENT DOCUMENTS

| | | | |
|---|---|---|---|
| 2017/0187502 A1 | 6/2017 | Lai et al. | |
| 2017/0264408 A1* | 9/2017 | Patel | H04L 5/0048 |
| 2017/0353273 A1* | 12/2017 | Zhang | H04L 1/1671 |
| 2019/0158206 A1* | 5/2019 | Li | H04B 7/0626 |
| 2019/0222380 A1* | 7/2019 | Manolakos | H04L 25/0224 |
| 2020/0235875 A1* | 7/2020 | Sha | H04L 25/0232 |
| 2021/0099991 A1* | 4/2021 | Liu | H04W 72/23 |
| 2022/0150838 A1* | 5/2022 | Takeda | H04L 1/1893 |

FOREIGN PATENT DOCUMENTS

| | | | |
|---|---|---|---|
| WO | 2007143277 A2 | 12/2007 | |
| WO | 2015197110 A1 | 12/2015 | |

OTHER PUBLICATIONS

Heinrich Meyr et al: "Chapter 12: Detection and Parameter Synchronization on Fading Channels"In: "Digital Communication Receivers: Synchronization, Channel Estimation, and Signal Processing", Jan. 1, 1998,pp. 631-677.

Yeh C-S et al: "OFDM system channel estimation using time-domain training sequence for mobile reception of digital terrestrial broadcasting",Sep. 1, 2000, pp. 215-220, XP002260472.

Nokia, Alcatel-Lucent Shanghai Bell, Remaining issues of UL IFDMA DMRS. 3GPP TSG RAN WG1 Meeting #87, Reno, Nevada, US, Nov. 14-18, 2016, R1-1611280, 6 pages.

\* cited by examiner

CHANNEL ESTIMATION METHOD AND APPARATUS

CROSS-REFERENCE TO RELATED APPLICATIONS

This application is a continuation of International Application No. PCT/CN2019/110260, filed on Oct. 10, 2019, the disclosure of which is hereby incorporated by reference in its entirety.

TECHNICAL FIELD

This application relates to the field of wireless communications technologies, and in particular, to a channel estimation method and apparatus.

BACKGROUND

Channel estimation is an important process for a receive end to estimate transmission channel quality, and is a key technology for a wireless communications system. The receive end mainly uses a pilot signal to estimate a frequency-domain response of a transmission channel, and uses a channel estimation result for coherent demodulation.

Noise reduction processing is mainly performed in frequency domain using existing channel estimation algorithms, to obtain a frequency-domain channel estimation result. However, this estimation method has limited estimation precision, which affects baseband demodulation performance. Consequently, a receive end cannot accurately restore a signal sent by a transmit end. Therefore, how to improve channel estimation quality is a technical problem that needs to be urgently resolved in a wireless communications system.

SUMMARY

In view of this, embodiments of this application provide a channel estimation method and apparatus, to further obtain a noise reduction gain and improve channel estimation precision, thereby further improving baseband demodulation performance.

To resolve the foregoing problem, embodiments of this application provide the following technical solutions.

According to a first aspect, a channel estimation method is provided. The method is applied to a receive end, and the method includes: determining a first slot and at least one second slot, where the first slot and the second slot form continuous slots; separately obtaining a first signal corresponding to the first slot and a second signal corresponding to the second slot, where the first signal and the second signal each include a pilot signal; and determining a time-domain channel estimate for the first slot based on the first signal and the second signal. In other words, when a time-domain channel estimate for a specific slot is determined, time-domain channel estimation is performed by using time-domain correlation of channels in combination with signals of a plurality of slots, so as to obtain a more accurate channel estimation result, thereby improving baseband demodulation performance.

With reference to the first aspect, in an embodiment, the determining a time-domain channel estimate for the first slot based on the first signal and the second signal includes: determining an initial channel estimate for the first slot based on the pilot signal in the first signal, and determining an initial channel estimate for the second slot based on the pilot signal in the second signal; and determining the time-domain channel estimate for the first slot based on the initial channel estimate for the first slot and the initial channel estimate for the second slot. In this implementation, before the time-domain channel estimate for the first slot is determined by using the first signal and the second signal, initial channel estimation is performed, so as to provide a signal with relatively high time-domain correlation for subsequent joint processing.

With reference to the first aspect, in an embodiment, the determining a time-domain channel estimate for the first slot based on the first signal and the second signal includes: determining a frequency-domain channel estimate for the first slot based on the pilot signal in the first signal, and determining a frequency-domain channel estimate for the second slot based on the pilot signal in the second signal; and determining the time-domain channel estimate for the first slot based on the frequency-domain channel estimate for the first slot and the frequency-domain channel estimate for the second slot. In this implementation, the frequency-domain channel estimate for the first slot and the frequency-domain channel estimate for the second slot are respectively determined by using the first signal and the second signal, so that the time-domain channel estimate for the first slot is determined by using the frequency-domain channel estimates for the two slots separately, thereby improving time-domain noise reduction performance.

With reference to the first aspect, in an embodiment, the method further includes:

performing, based on the time-domain channel estimate for the first slot, demodulation and decoding on a received signal corresponding to the first slot; and when a bit error exists in a demodulated and decoded received signal, sending bit error information to a transmit end, so that the transmit end increases a quantity of retransmissions based on the bit error information. In this implementation, demodulation and decoding may be performed on the received signal corresponding to the first slot based on the time-domain channel estimate for the first slot, so as to adjust the quantity of retransmissions at the transmit end based on a demodulation and decoding result, thereby effectively increasing a throughput rate of a user.

With reference to the first aspect, in an embodiment, the method further includes: determining a frequency-domain channel estimate for the first slot based on the pilot signal in the first signal, and performing, based on the frequency-domain channel estimate for the first slot, demodulation and decoding on a received signal corresponding to the first slot, to obtain a first check code; performing, based on the time-domain channel estimate for the first slot, demodulation and decoding on the received signal corresponding to the first slot, to obtain a second check code; and determining, as an actual received signal, a decoded signal corresponding to a check code that is in the first check code and the second check code and that meets a preset condition. In this implementation, the check codes of the signal that are obtained after the two times of demodulation and decoding are compared, and a signal obtained in a demodulation and decoding scheme corresponding to a check code that is a correct result in the two decoding results is determined as the actual received signal, thereby improving baseband demodulation performance.

In an embodiment, the determining the time-domain channel estimate for the first slot based on the initial channel estimate for the first slot and the initial channel estimate for the second slot includes: performing a transform on a signal matrix formed by the initial channel estimate for the first slot and the initial channel estimate for the second slot, to obtain a first signal matrix; multiplying the first signal matrix by a windowing matrix to obtain a second signal matrix; and performing an inverse transform on the second signal matrix to obtain the time-domain channel estimate for the first slot. In this implementation, windowing-based noise reduction is performed in a transform domain to obtain the time-domain channel estimate for the first slot.

In an embodiment, the determining the time-domain channel estimate for the first slot based on the initial channel estimate for the first slot and the initial channel estimate for the second slot includes: multiplying the initial channel estimate for the first slot and the initial channel estimate for the second slot by corresponding filtering coefficients respectively, and summing up obtained products, to obtain the time-domain channel estimate for the first slot. In this implementation, convolutional calculation is performed in time domain, to implement filtering and noise reduction without performing a transform, thereby increasing a processing rate.

In an embodiment, the determining the time-domain channel estimate for the first slot based on the frequency-domain channel estimate for the first slot and the frequency-domain channel estimate for the second slot includes: performing a transform on a frequency-domain channel estimate matrix formed by the frequency-domain channel estimate for the first slot and the frequency-domain channel estimate for the second slot, to obtain a first frequency-domain channel estimate matrix; multiplying the first frequency-domain channel estimate matrix by a windowing matrix to obtain a second frequency-domain channel estimate matrix; and performing an inverse transform on the second frequency-domain channel estimate matrix to obtain the time-domain channel estimate for the first slot. In this implementation, windowing-based noise reduction is performed in a transform domain to obtain the time-domain channel estimate for the first slot.

In an embodiment, the determining the time-domain channel estimate for the first slot based on the frequency-domain channel estimate for the first slot and the frequency-domain channel estimate for the second slot includes: multiplying the frequency-domain channel estimate for the first slot and the frequency-domain channel estimate for the second slot by corresponding filtering coefficients respectively, and summing up obtained products, to obtain the time-domain channel estimate for the first slot. In this implementation, convolutional calculation is performed in time domain, to implement filtering and noise reduction without performing a transform, thereby increasing a processing rate.

In an embodiment, during a fast Fourier transform, before the fast Fourier transform is performed, the method further includes: determining a number of transform points of the fast Fourier transform; and padding the signal matrix or the frequency-domain channel estimate matrix with a zero to reach the number of transform points. In this implementation, when the fast Fourier transform is performed, the signal matrix or the frequency-domain channel estimate matrix needs to be padded with a zero to reach a preset number of transform points, to ensure that the fast Fourier transform can be performed.

With reference to the fifth possible implementation of the first aspect, in a tenth possible implementation of the first aspect, the method further includes: performing interpolation on the time-domain channel estimate for the first slot, to obtain a time-domain channel estimate of a data signal corresponding to the first slot. In this implementation, after the time-domain channel estimate for the first slot is obtained, the channel estimate of the data signal corresponding to this slot may be obtained by using an interpolation method, thereby completing channel estimation.

In an embodiment, the method further includes: determining a frequency-domain channel estimate for the first slot based on the time-domain channel estimate for the first slot. In this implementation, when the time-domain channel estimation method provided in embodiments is performed before the frequency-domain channel estimate for the first slot is determined, the frequency-domain channel estimate for the first slot may be determined based on the time-domain channel estimate for the first slot, thereby improving frequency-domain channel estimation precision.

According to a second aspect, a channel estimation apparatus is provided. The apparatus is used in a receive end, and the apparatus includes: a first determining unit, configured to determine a first slot and at least one second slot, where the first slot and the second slot form continuous slots; a first obtaining unit, configured to separately obtain a first signal corresponding to the first slot and a second signal corresponding to the second slot, where the first signal and the second signal each include a pilot signal; and a second determining unit, configured to determine a time-domain channel estimate for the first slot based on the first signal and the second signal.

With reference to the second aspect, in an embodiment, the second determining unit includes: a first determining subunit, configured to determine an initial channel estimate for the first slot based on the pilot signal in the first signal, and determine an initial channel estimate for the second slot based on the pilot signal in the second signal; and a second determining subunit, configured to determine the time-domain channel estimate for the first slot based on the initial channel estimate for the first slot and the initial channel estimate for the second slot.

With reference to the second aspect, in an embodiment, the second determining unit includes: a third determining subunit, configured to determine a frequency-domain channel estimate for the first slot based on the pilot signal in the first signal, and determine a frequency-domain channel estimate for the second slot based on the pilot signal in the second signal; and a fourth determining subunit, configured to determine the time-domain channel estimate for the first slot based on the frequency-domain channel estimate for the first slot and the frequency-domain channel estimate for the second slot.

With reference to the second aspect, in a third possible implementation of the second aspect, the apparatus further includes: a demodulation and decoding unit, configured to perform, based on the time-domain channel estimate for the first slot, demodulation and decoding on a received signal corresponding to the first slot; and a sending unit, configured to: when a bit error exists in a demodulated and decoded received signal, send bit error information to a transmit end, so that the transmit end increases a quantity of retransmissions based on the bit error information.

With reference to the second aspect, in an embodiment, the apparatus further includes:

a second obtaining unit, configured to determine a frequency-domain channel estimate for the first slot based on the pilot signal in the first signal, and perform, based on the frequency-domain channel estimate for the first slot, demodulation and decoding on a received signal corresponding to the first slot, to obtain a first check code; a third obtaining unit, configured to perform, based on the time-domain channel estimate for the first slot, demodulation and decoding on the received signal corresponding to the first slot, to obtain a second check code; and a third determining unit, configured to determine, as an actual received signal, a decoded signal corresponding to a check code that is in the first check code and the second check code and that meets a preset condition.

in an embodiment, the second determining subunit is configured to perform a transform on a signal matrix formed by the initial channel estimate for the first slot and the initial channel estimate for the second slot, to obtain a first signal matrix; multiply the first signal matrix by a windowing matrix to obtain a second signal matrix; and perform an inverse transform on the second signal matrix to obtain the time-domain channel estimate for the first slot.

in an embodiment, the second determining subunit is configured to multiply the initial channel estimate for the first slot and the initial channel estimate for the second slot by corresponding filtering coefficients respectively, and sum up obtained products, to obtain the time-domain channel estimate for the first slot.

in an embodiment, the fourth determining subunit is configured to perform a transform on a frequency-domain channel estimate matrix formed by the frequency-domain channel estimate for the first slot and the frequency-domain channel estimate for the second slot, to obtain a first frequency-domain channel estimate matrix; multiply the first frequency-domain channel estimate matrix by a windowing matrix to obtain a second frequency-domain channel estimate matrix; and perform an inverse transform on the second frequency-domain channel estimate matrix to obtain the time-domain channel estimate for the first slot.

in an embodiment, the fourth determining subunit is configured to multiply the frequency-domain channel estimate for the first slot and the frequency-domain channel estimate for the second slot by corresponding filtering coefficients respectively, and sum up obtained products, to obtain the time-domain channel estimate for the first slot.

in an embodiment, during a fast Fourier transform, the apparatus further includes:

a fourth determining unit, configured to: before the fast Fourier transform is performed, determine a number of transform points of the fast Fourier transform; and a zero-padding unit, configured to pad the signal matrix or the frequency-domain channel estimate matrix with a zero to reach the number of transform points.

in an embodiment, the apparatus further includes: a fourth obtaining unit, configured to perform interpolation on the time-domain channel estimate for the first slot, to obtain a time-domain channel estimate of a data signal corresponding to the first slot.

in an embodiment, the apparatus further includes: a fifth determining unit, configured to determine a frequency-domain channel estimate for the first slot based on the time-domain channel estimate for the first slot.

It can be learned that, embodiments of this application have the following beneficial effects:

In embodiments of this application, when time-domain channel estimation is performed on the first slot, the first slot and at least one second slot are first determined. The first slot and each second slot form continuous slots. Then, the first signal corresponding to the first slot and the second signal corresponding to each second slot are obtained, and the time-domain channel estimate for the first slot is determined based on the first signal and each second signal. In other words, in embodiments of this application, when a time-domain channel estimate for a specific slot is determined, time-domain channel estimation is performed by using time-domain correlation of channels in combination with signals of a plurality of slots, so as to obtain a more accurate channel estimation result, thereby improving baseband demodulation performance.

DESCRIPTION OF EMBODIMENTS

The following are full names and related explanations of English acronyms used in embodiments of this application:

| | | |
|---|---|---|
| DMRS | DeModulation Reference Signal | Demodulation reference signal |
| LS | Least Squares | Least squares |
| PUSCH | Physical Uplink Shared Channel | Physical uplink shared channel |
| CRC | Cyclic Redundancy Check | Cyclic redundancy check |
| TTI | Transmission Time Interval | Transmission time interval |
| FFT | Fast Fourier Transform | Fast Fourier transform |
| DFT | Discrete Fourier Transform | Discrete Fourier transform |
| DCT | Discrete Cosine Transform | Discrete cosine transform |
| DPSS | Discrete Prolate Spheroidal Sequence | Discrete prolate spheroidal sequence |
| SVD | Singular Value Decomposition | Singular value decomposition |
| IFFT | Inverse Fast Fourier Transform | Inverse fast Fourier transform |
| RB | Resource Block | Resource block |
| eMTC | enhanced Machine Type Communication | Enhanced machine type communication |

| | | | |
|---|---|---|---|
| LTE | Long Term Evolution | Long Term Evolution | |
| LTE-A | LTE-Advanced | Long Term Evolution-Advanced | |
| NR | New Radio | New Radio | |

The following clearly describes technical solutions in embodiments of this application with reference to the accompanying drawings in embodiments of this application. It is clear that the described embodiments are merely some but not all of the embodiments of this application. All other embodiments obtained by a person of ordinary skill in the art based on embodiments of this application without creative efforts shall fall within the protection scope of this application.

For ease of understanding the technical solutions provided in this application, background technologies related to this application are first described.

Figure 1:
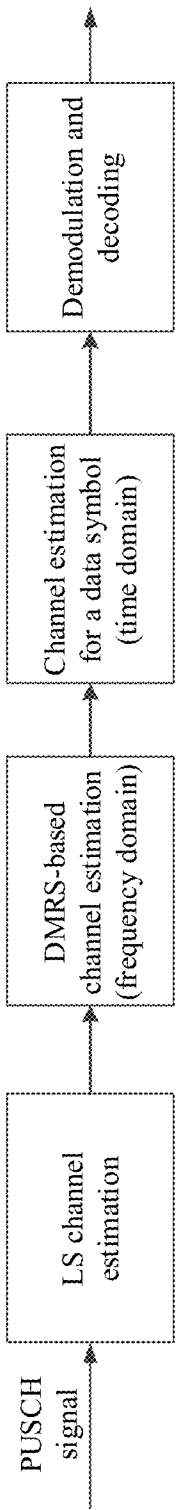
FIG. 1 is a schematic diagram of a conventional frequency-domain channel estimation method.

The inventor finds from research on a conventional channel estimation method that, noise reduction processing is mainly performed in frequency domain based on channels using conventional channel estimation algorithms. Because frequency-domain channel estimation precision is limited, decoding performance is affected when a frequency-domain channel estimation result is used for subsequent decoding. As a result, a received signal cannot be accurately restored. For ease of understanding, LTE uplink channel estimation is used as an example for description, as shown in FIG. 1. When estimation is performed on an LTE uplink channel, a demodulation reference signal DMRS in a received PUSCH signal is first used for LS channel estimation. Then, a result of the LS channel estimation is for DMRS-based frequency-domain channel estimation. Subsequently, a result of the DMRS-based frequency-domain channel estimation is used for time-domain channel estimation for a data symbol, so that demodulation and decoding are further performed based on a result of the time-domain channel estimation for the data symbol, to obtain an actual received signal.

To resolve the foregoing problem that baseband demodulation performance is affected by limited frequency-domain channel estimation quality, this application provides a channel estimation method, in which when channel estimation is performed at a receive end, a first slot and at least one second slot that can form continuous slots with the first slot are first determined. That is, it is ensured that subsequent time-domain channel estimation is performed by using the continuous slots. Then, a first signal corresponding to the first slot and a second signal corresponding to each second slot are obtained, and a time-domain channel estimate for the first slot is determined by using the first signal and each second signal. That is, noise reduction processing is performed by combining the signals of the plurality of slots to obtain the time-domain channel estimate for the first slot. In this way, channel estimation quality is improved, and baseband demodulation performance is further improved.

Figure 2:
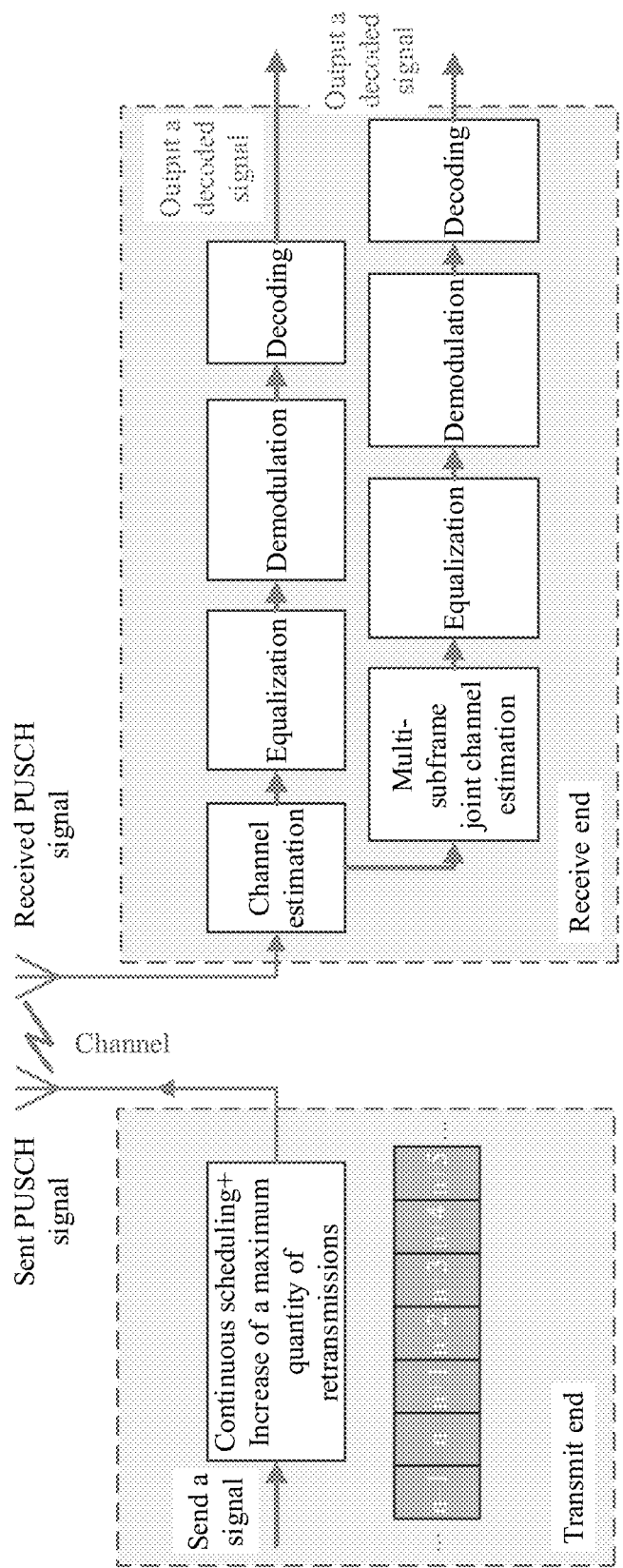
FIG. 2 is a schematic diagram of a type of channel estimation application according to an embodiment of this application.
Figure 3:
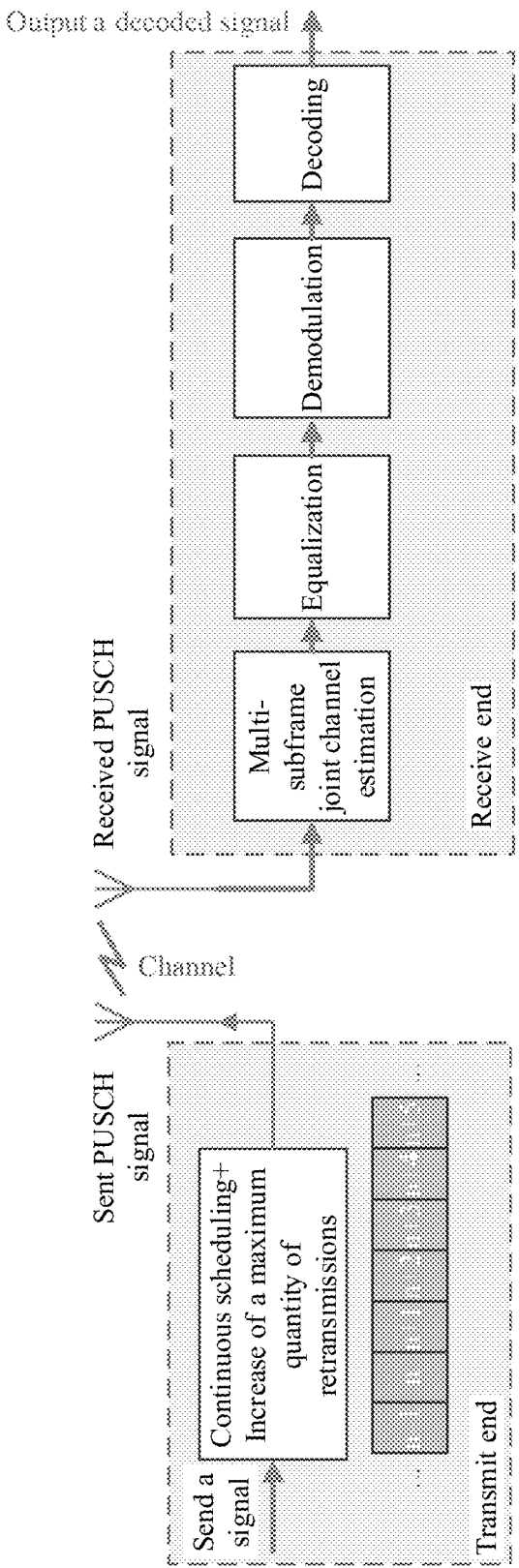
FIG. 3 is a schematic diagram of another type of channel estimation application according to an embodiment of this application.

It should be noted that, in the channel estimation method provided in this application, a time-domain channel estimation method may be added on the basis of an existing frequency-domain channel estimation method, to implement demodulation and decoding twice, as shown in FIG. 2; or time-domain channel estimation provided in this application may be used to replace existing frequency-domain channel estimation, to perform demodulation and decoding once, as shown in FIG. 3. Further, when demodulation and decoding are performed twice, the channel estimation method provided in this application may be performed before frequency-domain channel estimation, so that a time-domain channel estimation result may be used as a reference signal used in the frequency-domain channel estimation; or may be performed after frequency-domain channel estimation, so that a frequency-domain channel estimation result may be used as a reference signal (that is, the first signal) used in time-domain channel estimation. That is, two channel estimation operations are performed, and a channel estimation result with higher channel estimation quality is used as a reference signal for baseband demodulation, thereby improving baseband demodulation performance.

Figure 4:
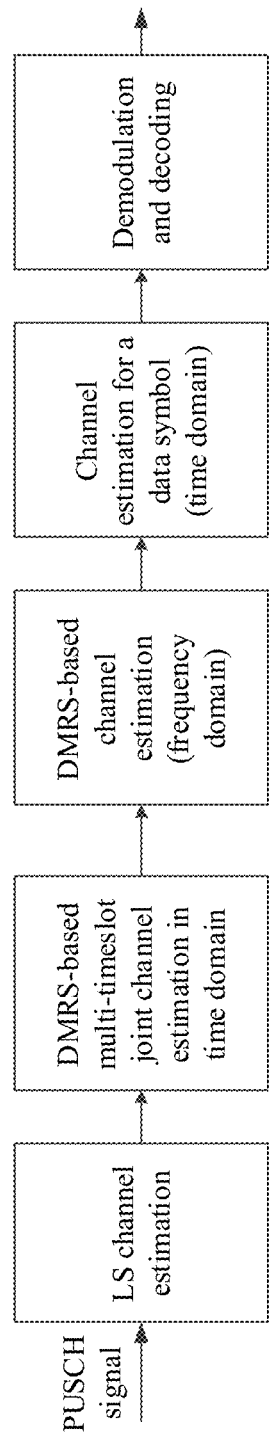
FIG. 4 is a schematic diagram of an application scenario according to an embodiment of this application.
Figure 5:
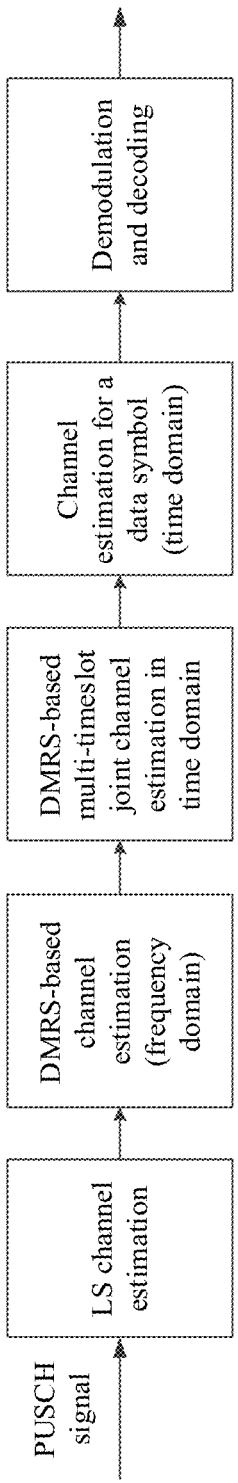
FIG. 5 is a schematic diagram of another application scenario according to an embodiment of this application.

In an example of LTE, the DMRS-based time-domain channel estimation method provided in embodiments of this application may be performed between LS channel estimation and DMRS-based frequency-domain channel estimation, or may be performed after DMRS-based frequency-domain channel estimation. When the time-domain channel estimation method provided in embodiments is performed before DMRS-based frequency-domain channel estimation, as shown in FIG. 4, a DMRS-based time-domain channel estimate for the first slot determined in this application is used as input of the DMRS-based frequency-domain channel estimation; a DMRS-based frequency-domain channel estimate for the first slot is determined based on the DMRS-based time-domain channel estimate for the first slot; then, a time-domain channel estimate for a data symbol that is corresponding to the first slot is determined based on the DMRS-based frequency-domain channel estimate for the first slot; and demodulation and decoding are performed. When the DMRS-based time-domain channel estimation provided in embodiments is performed after the DMRS-based frequency-domain channel estimation, as shown in FIG. 5, a DMRS-based time-domain channel for the first slot is determined by using a DMRS-based frequency-domain channel estimation result for the first slot and a DMRS-based frequency-domain channel estimation result for the second slot; then, a time-domain channel estimate for a data symbol is obtained by using the DMRS-based time-domain channel estimation result; and demodulation and decoding are performed.

In addition, the channel estimation method provided in embodiments of this application can be applied to various communications systems, for example, an LTE system, a Worldwide Interoperability for Microwave Access communications system, an eMTC communications system, a fifth-generation New Radio (NR) communications system, and a future communications system such as a 6G system. Moreover, the channel estimation method provided in this application may be used to perform estimation on an uplink transmission channel and also a downlink transmission channel of each of the foregoing communications systems. This is not limited herein.

For ease of understanding the channel estimation method provided in this application, the following describes a specific implementation process with reference to the accompanying drawings.

It should be noted that, in this application, a time-domain channel estimate for a specific slot is determined by combining a plurality of slots by using correlation between the plurality of slots. To ensure strong correlation between a plurality of slots, a slot scheduling scheme may be modified at a transmit end, so as to ensure the following: signals sent by the transmit end are continuous in time domain, a resource block RB location occupied by a pilot signal in a received signal corresponding to the first slot is the same as a resource block RB location occupied by a pilot signal in a received signal corresponding to each second slot, and a quantity of resource blocks RBs in the first slot is the same as a quantity of resource blocks RBs in the second slot.

Method Embodiment 1

Figure 6:
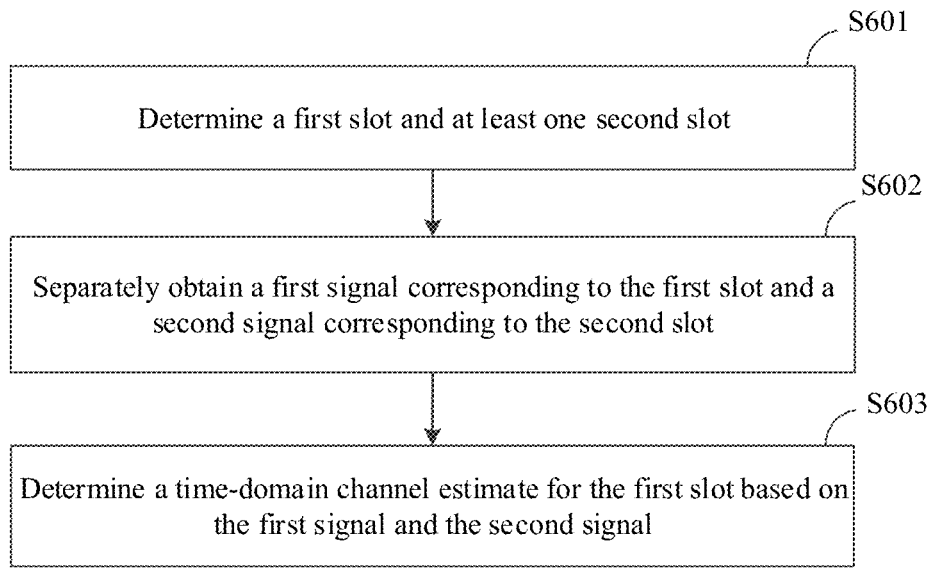
FIG. 6 is a flowchart of a channel estimation method according to an embodiment of this application.

FIG. 6 is a flowchart of a channel estimation method according to this embodiment of this application. As shown in FIG. 6, the method is applied to a receive end, and the method includes the following operations.

S601: Determine a first slot and at least one second slot, where the first slot and each second slot form continuous slots.

In this embodiment, a current to-be-processed slot, that is, the first slot, is first obtained, and at least one continuous slot corresponding to the first slot, that is, the second slot, is determined. In actual application, a plurality of second slots may be determined in a normal case to combine the plurality of second slots for time-domain channel estimation, and improve time-domain channel estimation precision for the first slot.

In specific implementation, when the second slot is determined, the first slot may be used as a reference object to determine a plurality of second slots before the first slot, after the first slot, or before and after the first slot. A specific determining manner may be set based on an actual application situation. This is not limited in this embodiment.

S602: Separately obtain a first signal corresponding to the first slot and a second signal corresponding to the second slot.

S603: Determine a time-domain channel estimate for the first slot based on the first signal and the second signal.

In this embodiment, after the plurality of second slots are determined, the first signal corresponding to the first slot and the second signal corresponding to each second slot are obtained. Then, joint processing is performed on the first signal and each second signal to obtain the time-domain channel estimate for the first slot. That is, time-domain channel estimation is performed on the current to-be-processed slot by combining the received signals of the plurality of slots by using correlation between the plurality of slots, thereby improving channel estimation quality and providing a more accurate reference basis for baseband demodulation. The first signal and the second signal each include a pilot signal.

In specific implementation, this embodiment provides two implementations for determining the time-domain channel estimate for the first slot based on the first signal and the second signal. In one implementation, an initial channel estimate for the first slot is obtained by using the pilot signal in the first signal, and an initial channel estimate for the second slot is obtained by using the pilot signal in the second signal; and then, the time-domain channel estimate for the first slot is determined based on the initial channel estimate of the first slot and the initial channel estimate for the second slot. Initial channel estimation is performed before the time-domain channel estimate for the first slot is determined based on the first signal and the second signal, and this is because signals received by the receive end by using an antenna have relatively weak correlation in time domain. Therefore, to facilitate subsequent joint noise reduction by using strong time-domain correlation of channels and to improve channel estimation quality, the initial channel estimation is first performed, so that signals with relatively strong time-domain correlation are provided for subsequent joint processing. In specific implementation, the initial channel estimation may be LS channel estimation, or may be other channel estimation. This is not limited herein in this embodiment.

In an embodiment, a frequency-domain channel estimate for the first slot is first determined based on the pilot signal in the first signal, and a frequency-domain channel estimate for the second slot is determined based on the pilot signal in the second signal; and then, the time-domain channel estimate for the first slot is determined based on the frequency-domain channel estimate for the first slot and the frequency-domain channel estimate for the second slot. That is, frequency-domain channel estimation is first performed by using the first signal and the second signal, and then time-domain channel estimation is performed by using a result of the frequency-domain channel estimation. For specific implementation in which the frequency-domain channel estimate for the first slot is determined based on the pilot signal in the first signal and the frequency-domain channel estimate for the second slot is determined based on the pilot signal in the second signal, refer to a conventional channel estimation method. Details are not described again in this embodiment.

It should be noted that, before the frequency-domain channel estimate for the first slot is determined by using the pilot signal in the first signal and the pilot signal in the second signal, an initial channel estimate for the first slot may be determined by using the pilot signal in the first signal, and an initial channel estimate for the second slot may be determined by using the pilot signal in the second signal; then, the frequency-domain channel estimate for the first slot is determined by using the initial channel estimate for the first slot, and the frequency-domain channel estimate for the second slot is determined by using the initial channel estimate for the second slot; and subsequently, the time-domain channel estimate for the first slot is determined based on the frequency-domain channel estimate for the first slot and the frequency-domain channel estimate for the second slot.

It can be understood that, when the determined second slot includes a slot after the first slot, a processing latency exists because time-domain channel estimation for the first slot starts only after a second signal corresponding to the second slot after the first slot is received.

It can be learned from the foregoing description that, in this embodiment of this application, when time-domain channel estimation is performed on the first slot, the first slot and at least one second slot are first determined. The first slot and each second slot form continuous slots. Then, the first signal corresponding to the first slot and the second signal corresponding to each second slot are obtained, and the time-domain channel estimate for the first slot is determined based on the first signal and each second signal. In other words, in this embodiment of this application, when a time-domain channel estimate is determined, time-domain channel estimation is performed by using time-domain correlation of channels in combination with signals of a plurality of slots, so as to obtain a more accurate channel estimation result, thereby improving baseband demodulation performance.

In an embodiment, after the time-domain channel estimate for the first slot is obtained, demodulation and decoding may be further performed on a received signal corresponding to the first slot based on the time-domain channel estimate for the first slot, so as to adjust a quantity of retransmissions at a transmit end based on a demodulation and decoding result. Demodulation and decoding are performed, based on the time-domain channel estimate for the first slot, on the received signal corresponding to the first slot; and when a bit error exists in a demodulated and decoded received signal, bit error information is sent to the transmit end, so that the transmit end increases the quantity of retransmissions based on the bit error information. That is, the quantity of retransmissions is increased to reduce a high-layer retransmission and increase a quantity of scheduling times at a physical layer. For a user with weak coverage, this is conducive to continuous scheduling of resource blocks RBs, and further improves channel estimation quality, thereby effectively increasing a throughput rate of the user. If transmitted data is insufficient to ensure continuous scheduling of RBs, a padding manner may be used to ensure continuity of resource blocks RBs. The bit error information is used to indicate that a bit error occurs in the demodulation and decoding performed at the transmit end this time, and a signal needs to be retransmitted.

In an embodiment, when the channel estimation method provided in this application is performed on the basis of frequency-domain channel estimation, the receive end may further perform demodulation and decoding twice, compare results of the two times of demodulation and decoding, and use a demodulated and decoded received signal with a better demodulation and decoding result as an actual received signal. A frequency-domain channel estimate for the first slot is determined based on the pilot signal in the first signal, and demodulation and decoding are performed, based on the frequency-domain channel estimate for the first slot, on a received signal corresponding to the first slot, to obtain a first check code; demodulation and decoding are performed, based on the time-domain channel estimate for the first slot, on the received signal corresponding to the first slot, to obtain a second check code; and a decoded signal corresponding to a check code that is in the first check code and the second check code and that meets a preset condition is determined as an actual received signal. That is, the check codes of the signal that are obtained after the two times of demodulation and decoding are compared, and a signal obtained in a demodulation and decoding scheme corresponding to a check code that is a correct result in the two decoding results is determined as the actual received signal. In specific implementation, a CRC check mode may be used to verify the demodulation and decoding results, so as to obtain the corresponding check codes.

In actual application, this application provides two joint processing manners: One is windowing-based noise reduction in a transform domain; and the other is time-domain filtering. For ease of understanding a specific implementation process of each processing manner, the following describes the two processing manners with reference to the accompanying drawings.

Method Embodiment 2

Figure 7:
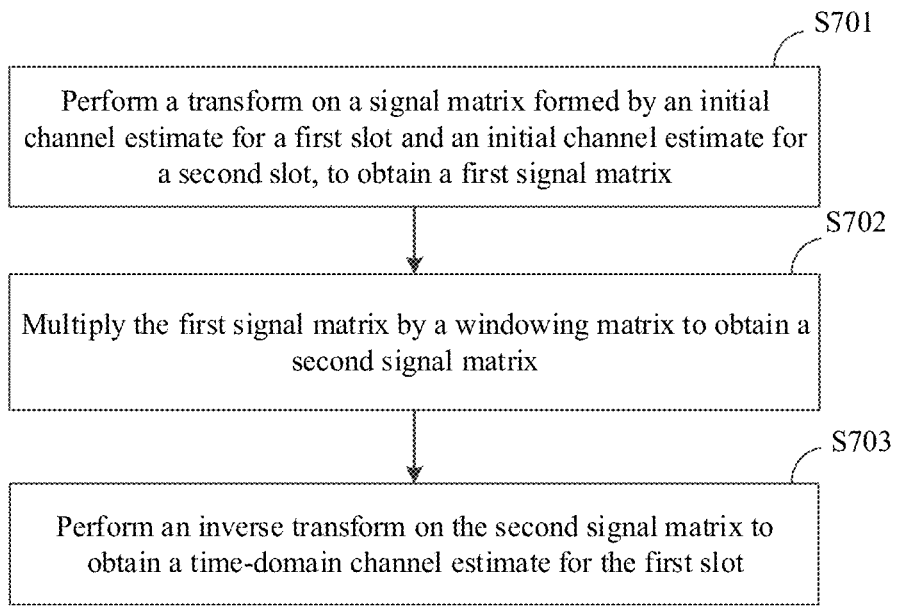
FIG. 7 is a flowchart of another channel estimation method according to an embodiment of this application.

This embodiment describes acquisition of a time-domain channel estimate for a first slot through windowing-based noise reduction in a transform domain. FIG. 7 is a flowchart of a method for obtaining a time-domain channel estimate according to this embodiment of this application. As shown in FIG. 7, the method may include the following operations.

S701: Perform a transform on a signal matrix formed by an initial channel estimate for a first slot and an initial channel estimate for a second slot, to obtain a first signal matrix.

In this embodiment, the signal matrix formed by the initial channel estimate for the first slot and the initial channel estimate for each second slot is transformed to the transform domain, to obtain the first signal matrix. The signal matrix is multiplied by a transform matrix to obtain the first signal matrix corresponding to the transform domain.

For ease of understanding, determined second slots are the first $N_{prev}$ slots and the last $N_{post}$ slots. If n is used to represent an index of the first slot, a signal for noise reduction should start from $n-N_{prev}$ and end at $n+N_{post}$. The signal matrix formed by the initial channel estimate for the first slot and the initial channel estimate for each second slot may be represented by:

$$\hat{H}_s = [\hat{H}_s(n-N_{prev}), \ldots, \hat{H}_s(n+N_{post})] \qquad (1)$$

$\hat{H}_s$ represents the signal matrix, $\hat{H}_s(n-N_{prev})$ represents an initial channel estimate corresponding to a slot whose index is $n-N_{prev}$, and $\hat{H}_s(n+N_{post})$ represents an initial channel estimate corresponding to a slot whose index is $n+N_{post}$.

In actual application, different types of transform, such as FFT, DFT, DCT, SVD, and DPSS, may be performed on the signal matrix. Correspondingly, different transform manners correspond to different transform matrices. It should be noted that, when a fast Fourier transform is performed on the signal matrix, before the signal matrix is multiplied by a Fourier transform matrix, a number of points of the fast Fourier transform further needs to be determined. After a signal in the signal matrix is padded in a zero-padding manner to reach a preset number of transform points, the signal is multiplied by the fast Fourier transform matrix to obtain the first signal matrix. The number of points of the fast Fourier transform may be determined according to the following formula:

$$N_{FFT} = \max\{64, 2^{ceil(\log N_{total})}\} \qquad (2)$$

$N_{FFT}$ represents the number of points of the fast Fourier transform, ceil( ) represents rounding up, $N_{total}$ represents a total quantity of slots for joint processing, and $N_{total}=N_{prev}+N_{post}+1$. After the number of points of the fast Fourier transform is determined by using formula (2), the signal matrix is padded in the zero-padding manner to reach the number of points of the fast Fourier transform, and a signal matrix obtained after the padding is:

$$\hat{H}_s = [\hat{H}_s(n-N_{prev}), \ldots, \hat{H}_s(n+N_{post}), 0, \ldots, ]( \qquad (3)$$

A transform is performed on the signal matrix, so that the signal matrix is transformed to the transform domain to obtain the first signal matrix:

$$\hat{H}_S^T = T(\hat{H}_S) \qquad (4)$$

$\hat{H}_S^T$ represents the first signal matrix, and T( ) is a transform function, where this transform function is for transforming the signal matrix $\hat{H}_S$ to obtain the first signal matrix.

S702: Multiply the first signal matrix by a windowing matrix to obtain a second signal matrix.

In this embodiment, after the first signal matrix corresponding to the transform domain is obtained, the first signal matrix is multiplied by the windowing matrix to obtain the second signal matrix. That is, windowing-based noise reduction is performed on the first signal matrix to obtain the second signal matrix. The windowing matrix includes a windowing coefficient, and the windowing coefficient may be determined based on a Doppler spread and a frequency offset value. The second signal matrix may be obtained by performing dot multiplication on a signal in the first signal matrix and the windowing coefficient of the windowing matrix according to the following formula:

$$\tilde{H}_s^T = \hat{H}_s^T \cdot w \tag{5}$$

w is the windowing matrix, and may include a plurality of windowing coefficients.

S703. Perform an inverse transform on the second signal matrix to obtain the time-domain channel estimate for the first slot.

After the second signal matrix that has undergone noise reduction is obtained, an inverse transform is performed on the second signal matrix to obtain the time-domain channel estimate for the first slot, as shown by the following formula:

$$\tilde{H}_s^{IT} = IT(\tilde{H}_s^T) \tag{6}$$

IT( ) is an inverse transform function, and is used to perform an inverse transform on the second signal matrix to obtain the time-domain channel estimate for the first slot, which is as follows:

$$\tilde{H}_s(n) = \tilde{H}_s^{IT}(N_{prev}) \tag{7}$$

$\tilde{H}_s(n)$ is the time-domain channel estimate corresponding to the first slot, and $\tilde{H}_s^{IT}(N_{prev})$ represents a signal corresponding to an index $N_{prev}$ in an inverse transform matrix.

For ease of understanding, LTE uplink channel estimation and an FFT transform are used as an example for description. A signal matrix may be represented as:

$$\hat{H}_{dmrs} = [\hat{H}_{dmrs}(n-N_{prev}), \ldots, \hat{H}_{dmrs}(n+N_{post})] \tag{8}$$

When the FFT transform is performed, the signal matrix is first padded to reach a number of transform points:

$$\hat{H}_{dmrs} = [\hat{H}_{dmrs}(n-N_{prev}), \ldots, \hat{H}_{dmrs}(n+N_{post}), 0, \ldots,]( \tag{9}$$

A transform is performed on the signal matrix to obtain a first signal matrix:

$$\hat{H}_{dmrs}^{FFT} = FFT(\hat{H}_{dmrs}) \tag{10}$$

The first signal matrix is multiplied by a windowing matrix to obtain a second signal matrix:

$$\tilde{H}_{dmrs}^{FFT} = \hat{H}_{dmrs}^{FFT} \cdot w \tag{11}$$

An inverse transform is performed on the second signal matrix to obtain the time-domain channel estimate for the first slot:

$$\tilde{H}_{dmrs}^{IFFT} = IFFT(\tilde{H}_{dmrs}^{FFT}) \tag{12}$$

The time-domain channel estimate for the first slot n is:

$$\tilde{H}_{dmrs}(n) = \tilde{H}_{dmrs}^{IFFT}(N_{prev}) \tag{13}$$

In the description of the foregoing embodiment, the time-domain channel estimate for the first slot is determined by using the method for performing windowing-based noise reduction in the transform domain. Another method for determining the time-domain channel estimate for the first slot by using time-domain filtering includes: multiplying the initial channel estimate for the first slot and the initial channel estimate for the second slot by corresponding filtering coefficients respectively, and summing up obtained products, to obtain the time-domain channel estimate for the first slot. That is, convolutional calculation is performed in time domain, to implement filtering and noise reduction without performing a transform, thereby increasing a processing rate. For ease of understanding, $N_{prev}$ second slots before the first slot and $N_{post}$ second slots after the first slot are still determined, and $N_{total} = N_{prev} + N_{post} + 1$. The following formula may be used for implementation:

$$\tilde{H}_s(n) = \sum_{l=\max(0, n-N_{prev})}^{\min(N, (n+N_{post}))} a_s \cdot \hat{H}_s(l) \tag{14}$$

$\tilde{H}_s(n)$ represents the time-domain channel estimate corresponding to the slot n, $\hat{H}_s(l)$ represents an initial channel estimate corresponding to a slot whose index is l, a value range of l is $[n-N_{prev}, n+N_{post}]$, N represents a total quantity of continuously scheduled slots, $\alpha_s$ represents a filtering coefficient, s represents a filtering coefficient index, and s is equal to 0, . . . , and $N_{total}-1$. In actual calculation, a value of s is as follows:

$$s = (l-n) \bmod (N_{post} + N_{prev} + 1) \tag{15}$$

The time-domain channel estimate for the first slot may be determined based on the initial channel estimate corresponding to the first slot and the initial channel estimate corresponding to each second slot by using the time-domain filtering method provided by the foregoing formula.

In the description of the foregoing embodiment, the receive end may determine the initial channel estimate for the first slot and the initial channel estimate for the second slot based on the pilot signal in the first signal and the pilot signal in the second signal respectively, and determine the time-domain channel estimate for the first slot based on the initial channel estimate for the first slot and the initial channel estimate for the second slot. In an embodiment, alternatively, the receive end may determine the frequency-domain channel estimate for the first slot based on the pilot signal in the first signal, and determine the frequency-domain channel estimate for the second slot based on the pilot signal in the second signal; and then determine the time-domain channel estimate for the first slot based on the frequency-domain channel estimate for the first slot and the frequency-domain channel estimate for the second slot. That is, time-domain channel estimation is performed on the basis of frequency-domain channel estimation.

It should be noted that, when the receive end determines the time-domain channel estimate for the first slot based on the frequency-domain channel estimates, two manners may be used for implementation. One manner is to perform windowing-based noise reduction on the frequency-domain channel estimates in the transform domain to obtain the time-domain channel estimate for the first slot. The other manner is to perform filtering on the frequency-domain channel estimates in time domain to obtain the time-domain channel estimate for the first slot. For ease of understanding, the following separately describes the foregoing two different implementations.

Method Embodiment 3

Figure 8:
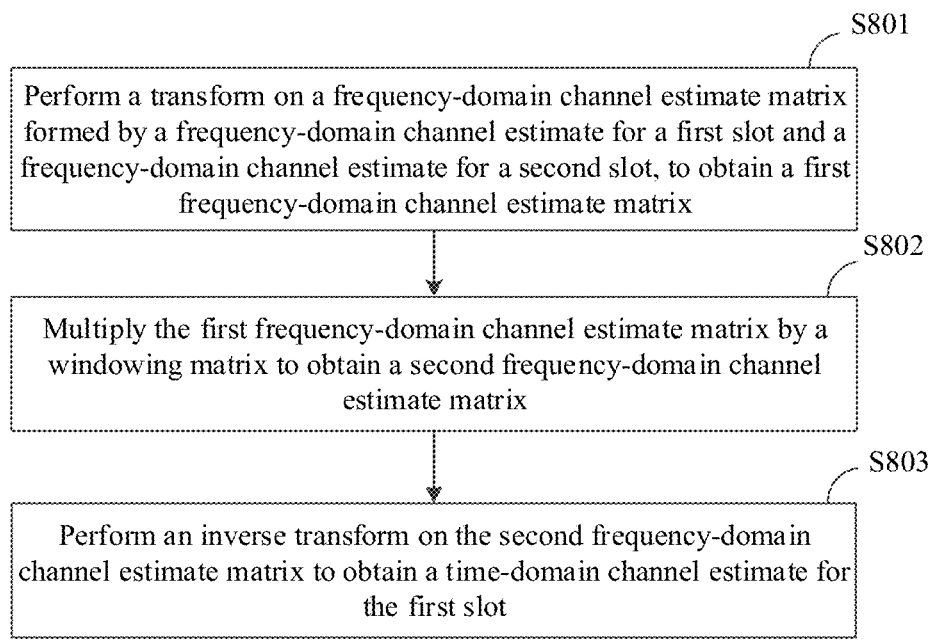
FIG. 8 is a flowchart of still another channel estimation method according to an embodiment of this application.

FIG. 8 is a flowchart of another channel estimation method according to an embodiment of this application. As shown in FIG. 8, the method is applied to a receive end, and may include the following operations.

S801: Perform a transform on a frequency-domain channel estimate matrix formed by a frequency-domain channel estimate for a first slot and a frequency-domain channel estimate for a second slot, to obtain a first frequency-domain channel estimate matrix.

In this embodiment, the frequency-domain channel estimate matrix formed by the frequency-domain channel estimate for the first slot and the frequency-domain channel estimate for the second slot is transformed to a transform domain to obtain the first frequency-domain channel estimate matrix. The frequency-domain channel estimate matrix may be multiplied by a transform matrix to obtain the first frequency-domain channel estimate matrix corresponding to the transform domain. For an expression form of the frequency-domain channel estimate matrix, refer to formula (1). For implementation of the transform on the frequency-domain channel estimate matrix, refer to formula (4).

It should be noted that, when a fast Fourier transform FFT is performed on the frequency-domain channel estimate matrix, a number of transform points of the FFT is first determined before the transform, the frequency-domain channel estimate matrix is padded in a zero-padding manner to reach the number of transform points, and then an FFT transform operation is performed. For an implementation of determining the number of transform points, refer to formula (2).

S802: Multiply the first frequency-domain channel estimate matrix by a windowing matrix to obtain a second frequency-domain channel estimate matrix.

After the first frequency-domain channel estimate matrix corresponding to the transform domain is obtained, the first frequency-domain channel estimate matrix is multiplied by the windowing matrix to obtain the second frequency-domain channel estimate matrix. That is, windowing-based noise reduction is performed on the first frequency-domain channel estimate matrix to obtain the second frequency-domain channel estimate matrix. The windowing matrix includes a windowing coefficient, and the windowing coefficient may be determined based on a Doppler spread and a frequency offset value. The second frequency-domain channel estimate matrix may be obtained by performing dot multiplication on a signal in the first frequency-domain channel estimate matrix and the windowing coefficient of the windowing matrix by using formula (5).

S803: Perform an inverse transform on the second frequency-domain channel estimate matrix to obtain the time-domain channel estimate for the first slot.

After the second frequency-domain channel estimate matrix that has undergone noise reduction is obtained, an inverse transform is performed on the matrix to obtain the time-domain channel estimate for the first slot. The frequency-domain channel estimate for the first slot may be obtained by referring to formula (6) and formula (7).

In the description of the foregoing embodiment, the time-domain channel estimate for the first slot is obtained by performing windowing-based noise reduction in the transform domain. Another method for determining the time-domain channel estimate for the first slot by using time-domain filtering is as follows: multiplying the frequency-domain channel estimate for the first slot and the frequency-domain channel estimate for the second slot by corresponding filtering coefficients respectively, and summing up obtained products, to obtain the time-domain channel estimate for the first slot. That is, the receive end directly performs convolutional calculation in time domain, to implement filtering and noise reduction without performing a transform, thereby increasing a processing rate. For an implementation of performing filtering and noise reduction in time domain, refer to formula (14) and formula (15). Details are not described herein again in this embodiment.

Figure 9:
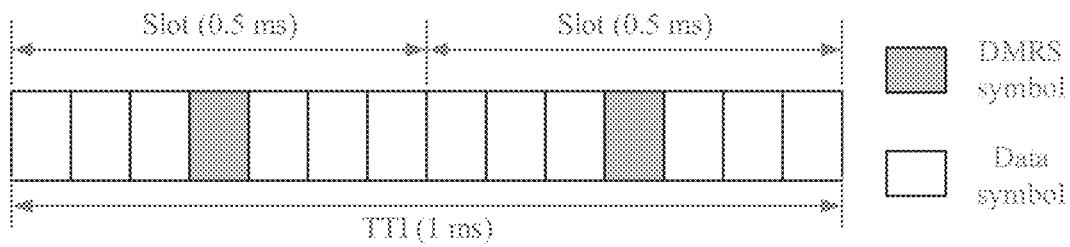
FIG. 9 is a diagram of a composition structure of a subframe according to an embodiment of this application.

In addition, a person skilled in the art can understand that, during actual processing, one subframe may be used as a processing object to implement the channel estimation method provided in this application. In a wireless communications system, one radio frame includes a plurality of subframes of a same length, a TTI of each subframe may include two slots, and each slot corresponds to one pilot signal. For example, in an LTE system, one subframe is 1 ms, each slot is 0.5 ms, and one subframe includes a total of 14 symbols in time domain, which are respectively denoted by 0-13. Symbol 3 and symbol 10 are pilot signals, and the rest are data symbols, as shown in FIG. 9. For ease of understanding a specific implementation in which a subframe is used as a processing object, the following describes, with reference to the accompanying drawings, the implementation in which a subframe is used as a processing object.

Method Embodiment 4

Figure 10:
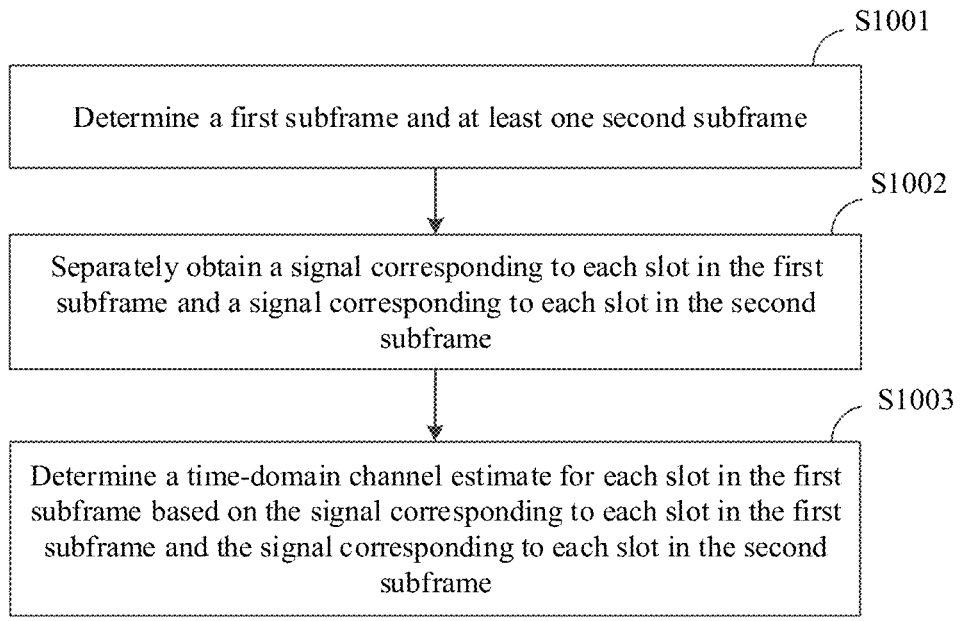
FIG. 10 is a flowchart of yet another channel estimation method according to an embodiment of this application.

FIG. 10 shows another channel estimation method according to an embodiment of this application. As shown in FIG. 10, the method is applied to a receive end, and includes the following operations.

S1001. Determine a first subframe and at least one second subframe, where the first subframe and each second subframe form continuous subframes.

That is, the to-be-processed first subframe and the second subframe that form continuous subframes with the first subframe are determined, so as to determine a time-domain channel estimate for each slot in the first subframe based on the plurality of continuous subframes. In specific implementation, the first subframe may be used as a reference object, to determine several second subframes before the first subframe, or determine several second subframes after the first subframe, or determine several second subframes before and after the first subframe. A specific determining manner may be set based on an actual requirement.

S1002: Separately obtain a signal corresponding to each slot in the first subframe and a signal corresponding to each slot in the second subframe.

S1003. Determine a time-domain channel estimate for each slot in the first subframe based on the signal corresponding to each slot in the first subframe and the signal corresponding to each slot in the second subframe.

When the first subframe and the second subframe corresponding to the first subframe are determined, a signal corresponding to each slot in each subframe is obtained to determine the time-domain channel estimate for each slot in the first subframe based on the signal corresponding to each slot. A signal corresponding to a slot may be an initial channel estimate, or may be a frequency-domain channel estimate. This is not limited herein in this embodiment.

In specific implementation, the receive end may also determine the time-domain channel estimate for each slot in the first subframe in a manner of performing windowing-based noise reduction in a transform domain or by using a time-domain filtering method. For ease of understanding, with respect to TTI n of the to-be-processed first subframe, joint processing is performed on TTIs of $N_{prev}$ second subframes before the TTI and TTIs of $N_{post}$ second subframes after the TTI (a total of $N_{total}$ consecutive subframes, where $N_{total}=N_{prev}+N_{post}+1$). A signal corresponding to each of $2*N_{total}$ slots is obtained to form a signal matrix, as shown in the following formula:

$$\hat{H}_s=[\hat{H}_s(2(n-N_{prev})), \ldots, \hat{H}_s(2(n+N_{post})+] \quad (16)$$

If an FFT is performed on the signal matrix, a number of transform points of the FFT further needs to be determined. The number of transform points may be determined according to the following formula:

$$N_{FFT} = \max\{64, 2^{ceil(\log 2N_{total})}\} \quad (17)$$

The signal matrix is padded with a zero to reach the number of points of the FFT, and a signal matrix obtained after zero-padding is:

$$\hat{H}_s = [\hat{H}_s(2(n-N_{prev})), \ldots, \hat{H}_s(2(n+N_{post})+1), 0, \ldots] \quad (18)$$

A transform is performed on the signal matrix to obtain a first signal matrix:

$$\hat{H}_s^T = T(\hat{H}_s) \quad (19)$$

The first signal matrix is multiplied by a windowing matrix to obtain a second signal matrix:

$$\tilde{H}_s^T = \hat{H}_s^T \cdot w \quad (20)$$

An inverse transform is performed on the second signal matrix to obtain the time-domain channel estimate for each slot in the first subframe:

$$\tilde{H}_s^{IT} = IT(\tilde{H}_s^T) \quad (21)$$

The time-domain channel estimates corresponding to the two slots in the first subframe are:

$$\tilde{H}_s(2n) = \tilde{H}_s^{IT}(2N_{prev}), \tilde{H}_s(2n+1) = \tilde{H}_s^{IT}(2N_{prev}+1) \quad (22)$$

$\hat{H}_s(2n)$ and $\hat{H}_s(2n+1)$ respectively represent time-domain channel estimation results of slot 0 and slot 1 in TTI n of the first subframe.

Time-domain filtering may be performed according to the following formula:

$$\tilde{H}_s(2n) = \sum_{l=\max(0,2(n-N_{prev}))}^{\min(2N+1,2(n+N_{post})+1)} a_s \cdot \hat{H}_s(l) \quad (23)$$

$\hat{H}_s(l)$ represents a signal corresponding to a slot whose index is l, $\tilde{H}_s(2n)$ represents the time-domain channel estimate for slot 0 in TTI n of the first subframe, s is equal to 0, ..., and $2*N_{total}-1$, and in the foregoing formula, a value of s is:

$$s = (l-2n) \bmod 2(N_{post}+N_{prev}+1) \quad (24)$$

The time-domain channel estimate for slot 1 in TTI n of the first subframe is:

$$\tilde{H}_s(2n+1) = \sum_{l=\max(0,2(n-N_{prev}))}^{\min(2N+1,2(n+N_{post})+1)} a_s \cdot \hat{H}_s(l) \quad (25)$$

s is equal to 0, ..., and $2*N_{total}-1$, and in the foregoing formula, a value of s is:

$$s = (l-2n-1) \bmod 2(N_{post}+N_{prev}+1) \quad (26)$$

In actual application, when applied to LTE uplink DMRS-based channel estimation, the foregoing implementation process may be represented as follows in an example of an FFT transform.

A signal matrix formed by signals corresponding to the respective slots of the first subframe and the second subframe is:

$$\hat{H}_{dmrs} = [\hat{H}_{dmrs}(2(n-N_{prev})), \ldots, \hat{H}_{dmrs}(2(n+N_{post})+1] \quad (27)$$

The $2*N_{total}$ signals are padded with a zero to reach the number of transform points of the FFT, and a signal matrix obtained after zero-padding is:

$$\hat{H}_{dmrs} = [\hat{H}_{dmrs}(2(n-N_{prev})), \ldots, \hat{H}_{dmrs}(2(n+N_{post})+1), 0, \ldots, 0] \quad (28)$$

The FFT is performed on the signal matrix to obtain a first signal matrix:

$$\hat{H}_{dmrs}^{FFT} = FFT(\hat{H}_{dmrs}) \quad (29)$$

The first signal matrix is multiplied by a windowing matrix to obtain a second signal matrix:

$$\tilde{H}_{dmrs}^{FFT} = \hat{H}_{dmrs}^{FFT} \cdot w \quad (30)$$

An inverse Fourier transform is performed on the second signal matrix to obtain the time-domain channel estimates respectively corresponding to the two slots in TTI n of the first subframe:

$$\tilde{H}_{dmrs}^{IFFT} = IFFT(\tilde{H}_{dmrs}^{FFT}) \quad (31)$$

The DMRS-based time-domain channel estimate corresponding to slot 0 in TTI n of the first subframe is:

$$\tilde{H}_{dmrs}(2n) = \tilde{H}_{dmrs}^{IFFT}(2N_{prev}) \quad (32)$$

The DMRS-based time-domain channel estimate corresponding to slot 1 in TTI n of the first subframe is:

$$\tilde{H}_{dmrs}(2n+1) = \tilde{H}_{dmrs}^{IFFT}(2N_{prev}+1) \quad (33)$$

Time-domain channel estimates corresponding to two slots in one subframe may be obtained by using the foregoing formulas, so as to perform subsequent processing by using the time-domain channel estimates of the slots.

Based on the foregoing method embodiments, this application further provides a channel estimation apparatus. The following describes the apparatus with reference to the accompanying drawings.

Apparatus Embodiment

Figure 11:
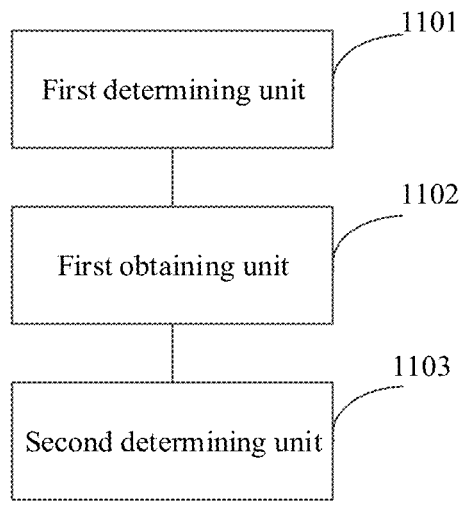
FIG. 11 is a diagram of a structure of a channel estimation apparatus according to an embodiment of this application.

FIG. 11 is a diagram of a structure of a channel estimation apparatus according to an embodiment of this application. As shown in FIG. 11, the apparatus is used in a receive end, and may include:

a first determining unit 1101, configured to determine a first slot and at least one second slot, where the first slot and the second slot form continuous slots;

a first obtaining unit 1102, configured to separately obtain a first signal corresponding to the first slot and a second signal corresponding to the second slot, where the first signal and the second signal each include a pilot signal; and a second determining unit 1103, configured to determine a time-domain channel estimate for the first slot based on the first signal and the second signal.

In an embodiment, the second determining unit includes:

a first determining subunit, configured to determine an initial channel estimate for the first slot based on the pilot signal in the first signal, and determine an initial channel estimate for the second slot based on the pilot signal in the second signal; and a second determining subunit, configured to determine the time-domain channel estimate for the first slot based on the initial channel estimate for the first slot and the initial channel estimate for the second slot.

In an embodiment, the second determining unit includes:

a third determining subunit, configured to determine a frequency-domain channel estimate for the first slot based on the pilot signal in the first signal, and determine a frequency-domain channel estimate for the second slot based on the pilot signal in the second signal; and a fourth determining subunit, configured to determine the time-domain channel estimate for the first slot based on the frequency-domain channel estimate for the first slot and the frequency-domain channel estimate for the second slot.

In an embodiment, the apparatus further includes:

a demodulation and decoding unit, configured to perform, based on the time-domain channel estimate for the first slot, demodulation and decoding on a received signal corresponding to the first slot; and a sending unit, configured to: when a bit error exists in a demodulated and decoded received signal, send bit error information to a transmit end, so that the transmit end increases a quantity of retransmissions based on the bit error information.

In an embodiment, the apparatus further includes:

a second obtaining unit, configured to determine a frequency-domain channel estimate for the first slot based on the pilot signal in the first signal, and perform, based on the frequency-domain channel estimate for the first slot, demodulation and decoding on a received signal corresponding to the first slot, to obtain a first check code;

a third obtaining unit, configured to perform, based on the time-domain channel estimate for the first slot, demodulation and decoding on the received signal corresponding to the first slot, to obtain a second check code; and a third determining unit, configured to determine, as an actual received signal, a decoded signal corresponding to a check code that is in the first check code and the second check code and that meets a preset condition.

In an embodiment, the second determining subunit is configured to perform a transform on a signal matrix formed by the initial channel estimate for the first slot and the initial channel estimate for the second slot, to obtain a first signal matrix; multiply the first signal matrix by a windowing matrix to obtain a second signal matrix; and perform an inverse transform on the second signal matrix to obtain the time-domain channel estimate for the first slot.

In an embodiment, the second determining subunit is configured to multiply the initial channel estimate for the first slot and the initial channel estimate for the second slot by corresponding filtering coefficients respectively, and sum up obtained products, to obtain the time-domain channel estimate for the first slot.

In an embodiment, the fourth determining subunit is configured to perform a transform on a frequency-domain channel estimate matrix formed by the frequency-domain channel estimate for the first slot and the frequency-domain channel estimate for the second slot, to obtain a first frequency-domain channel estimate matrix; multiply the first frequency-domain channel estimate matrix by a windowing matrix to obtain a second frequency-domain channel estimate matrix; and perform an inverse transform on the second frequency-domain channel estimate matrix to obtain the time-domain channel estimate for the first slot.

In an embodiment, the fourth determining subunit is configured to multiply the frequency-domain channel estimate for the first slot and the frequency-domain channel estimate for the second slot by corresponding filtering coefficients respectively, and sum up obtained products, to obtain the time-domain channel estimate for the first slot.

In an embodiment, during a fast Fourier transform, the apparatus further includes:

a fourth determining unit, configured to: before the fast Fourier transform is performed, determine a number of transform points of the fast Fourier transform; and a zero-padding unit, configured to pad the signal matrix or the frequency-domain channel estimate matrix with a zero to reach the number of transform points.

In an embodiment, the apparatus further includes:

a fourth obtaining unit, configured to perform interpolation on the time-domain channel estimate for the first slot, to obtain a time-domain channel estimate of a data signal corresponding to the first slot.

In an embodiment, the apparatus further includes:

a fifth determining unit, configured to determine a frequency-domain channel estimate for the first slot based on the time-domain channel estimate for the first slot.

It should be noted that, for implementation of each unit in this embodiment, refer to the foregoing method embodiments. Details are not described herein again in this embodiment.

It can be learned from the foregoing embodiment that, when time-domain channel estimation is performed on the first slot, the first slot and at least one second slot are first determined. The first slot and each second slot form continuous slots. Then, the first signal corresponding to the first slot and the second signal corresponding to each second slot are obtained, and the time-domain channel estimate for the first slot is determined based on the first signal and each second signal. In other words, in this embodiment of this application, when a time-domain channel estimate is determined, time-domain channel estimation is performed by using time-domain correlation of channels in combination with signals of a plurality of slots, so as to obtain a more accurate channel estimation result, thereby improving baseband demodulation performance.

It should be noted that embodiments in this specification are described in a progressive manner, each embodiment focuses on a difference from other embodiments, and for same or similar parts in embodiments, refer to these embodiments. The system or apparatus disclosed in embodiments corresponds to the method disclosed in embodiments, and therefore is briefly described. For related parts, refer to the description of the method.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

It should be further noted that, in this specification, relationship terms such as first and second are only used to distinguish one entity or operation from another entity or operation, and do not necessarily require or imply that any actual relationship or sequence exists between these entities or operations. In addition, terms "include" and "have" and any variants thereof are intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

In combination with embodiments disclosed in this specification, method or algorithm operations may be implemented by hardware, a software module executed by a processor, or a combination thereof. The software module may be disposed in a random access memory (RAM), a memory, a read-only memory (ROM), an electrically programmable ROM, an electrically erasable programmable ROM, a register, a hard disk, a removable magnetic disk, a CD-ROM, or any other form of storage medium known in the art. Embodiments disclosed above are described to enable a person skilled in the art to implement or use this application. Various modifications to embodiments are obvious to the person skilled in the art, and general principles defined in this specification may be implemented in other embodiments without departing from the spirit or scope of this application. Therefore, this application is not limited to embodiments described in this specification but extends to the widest scope that complies with the principles and novelty disclosed in this specification.

What is claimed is:

1. A channel estimation method applied to a receive end, wherein the method comprises:
   determining a first slot and at least one second slot, wherein the first slot and the second slot form continuous slots;
   separately obtaining a first signal corresponding to the first slot and a second signal corresponding to the second slot, wherein the first signal and the second signal each comprise a pilot signal;
   determining a first channel estimate for the first slot based on the pilot signal in the first signal, and determining a second channel estimate for the second slot based on the pilot signal in the second signal; and
   determining a time-domain channel estimate for the first slot based on the first channel estimate for the first slot and the second channel estimate for the second slot.

2. The method according to claim 1, wherein the first channel estimate for the first slot comprises an initial channel estimate for the first slot and the second channel estimate for the second slot comprises an initial channel estimate for the second slot, and
   wherein the determining the time-domain channel estimate for the first slot based on the first channel estimate for the first slot and the second channel estimate for the second slot comprises determining the time-domain channel estimate for the first slot based on the initial channel estimate for the first slot and the initial channel estimate for the second slot.

3. The method according to claim 2, wherein the determining of the time-domain channel estimate for the first slot based on the initial channel estimate for the first slot and the initial channel estimate for the second slot comprises:
   performing a transform on a signal matrix formed by the initial channel estimate for the first slot and the initial channel estimate for the second slot, to obtain a first signal matrix;
   multiplying the first signal matrix by a windowing matrix to obtain a second signal matrix; and
   performing an inverse transform on the second signal matrix to obtain the time-domain channel estimate for the first slot.

4. The method according to claim 3, wherein during a fast Fourier transform, before the fast Fourier transform is performed, the method further comprises:
   determining a number of transform points of the fast Fourier transform; and
   padding the signal matrix or a frequency-domain channel estimate matrix with a zero to reach the number of transform points.

5. The method according to claim 2, wherein the determining of the time-domain channel estimate for the first slot based on the initial channel estimate for the first slot and the initial channel estimate for the second slot comprises:
   multiplying the initial channel estimate for the first slot and the initial channel estimate for the second slot by corresponding filtering coefficients respectively, and summing up obtained products, to obtain the time-domain channel estimate for the first slot.

6. The method according to claim 1, wherein the first channel estimate for the first slot comprises a frequency-domain channel estimate for the first slot and the second channel estimate for the second slot comprises a frequency-domain channel estimate for the second slot, and
   wherein the determining the time-domain channel estimate for the first slot based on the first channel estimate for the first slot and the second channel estimate for the second slot comprises determining the time-domain channel estimate for the first slot is based on the frequency-domain channel estimate for the first slot and the frequency-domain channel estimate for the second slot.

7. The method according to claim 6, wherein the determining of the time-domain channel estimate for the first slot based on the frequency-domain channel estimate for the first slot and the frequency-domain channel estimate for the second slot comprises:
   performing a transform on a frequency-domain channel estimate matrix formed by the frequency-domain channel estimate for the first slot and the frequency-domain channel estimate for the second slot, to obtain a first frequency-domain channel estimate matrix;
   multiplying the first frequency-domain channel estimate matrix by a windowing matrix to obtain a second frequency-domain channel estimate matrix; and
   performing an inverse transform on the second frequency-domain channel estimate matrix to obtain the time-domain channel estimate for the first slot.

8. The method according to claim 6, wherein the determining of the time-domain channel estimate for the first slot based on the frequency-domain channel estimate for the first slot and the frequency-domain channel estimate for the second slot comprises:
   multiplying the frequency-domain channel estimate for the first slot and the frequency-domain channel estimate for the second slot by corresponding filtering coefficients respectively, and summing up obtained products, to obtain the time-domain channel estimate for the first slot.

9. The method according to claim 1, wherein the method further comprises:
   performing, based on the time-domain channel estimate for the first slot, demodulation and decoding on a received signal corresponding to the first slot; and
   when a bit error exists in the received signal that has been demodulated and decoded, sending bit error information to a transmit end, wherein the transmit end increases a quantity of retransmissions based on the bit error information.

10. The method according to claim 1, wherein the first channel estimate for the first slot comprises a frequency-domain channel estimate for the first slot, and wherein the method further comprises:
and performing, based on the frequency-domain channel estimate for the first slot, demodulation and decoding on a received signal corresponding to the first slot, to obtain a first check code;
performing, based on the time-domain channel estimate for the first slot, demodulation and decoding on the received signal corresponding to the first slot, to obtain a second check code; and
determining, as an actual received signal, a decoded signal corresponding to a check code that is in the first check code and the second check code and that meets a preset condition.

11. A channel estimation apparatus in a receive end, wherein the apparatus comprises:
a processor;
a memory coupled to the processor and storing program instructions, which, when executed by the processor, cause the processor to perform operations comprising:
determining a first slot and at least one second slot, wherein the first slot and the second slot form continuous slots;
separately obtaining a first signal corresponding to the first slot and a second signal corresponding to the second slot, wherein the first signal and the second signal each comprise a pilot signal;
determining a first channel estimate for the first slot based on the pilot signal in the first signal, and determining a second channel estimate for the second slot based on the pilot signal in the second signal; and
determining a time-domain channel estimate for the first slot based on the first channel estimate for the first slot and the second channel estimate for the second slot.

12. The apparatus according to claim 11, wherein the first channel estimate for the first slot comprises an initial channel estimate for the first slot and the second channel estimate for the second slot comprises an initial channel estimate for the second slot, and
wherein the determining the time-domain channel estimate for the first slot based on the first channel estimate for the first slot and the second channel estimate for the second slot comprises determining the time-domain channel estimate for the first slot based on the initial channel estimate for the first slot and the initial channel estimate for the second slot.

13. The apparatus according to claim 12, wherein the determining of the time-domain channel estimate for the first slot based on the initial channel estimate for the first slot and the initial channel estimate for the second slot comprises:
performing a transform on a signal matrix formed by the initial channel estimate for the first slot and the initial channel estimate for the second slot, to obtain a first signal matrix;
multiplying the first signal matrix by a windowing matrix to obtain a second signal matrix; and
performing an inverse transform on the second signal matrix to obtain the time-domain channel estimate for the first slot.

14. The apparatus according to claim 12, wherein the determining of the time-domain channel estimate for the first slot based on the initial channel estimate for the first slot and the initial channel estimate for the second slot comprises
multiplying the initial channel estimate for the first slot and the initial channel estimate for the second slot by corresponding filtering coefficients respectively, and sum up obtained products, to obtain the time-domain channel estimate for the first slot.

15. The apparatus according to claim 11, wherein the first channel estimate for the first slot comprises a frequency-domain channel estimate for the first slot and the second channel estimate for the second slot comprises a frequency-domain channel estimate for the second slot, and
wherein the determining the time-domain channel estimate for the first slot based on the first channel estimate for the first slot and the second channel estimate for the second slot comprises determining the time-domain channel estimate for the first slot based on the frequency-domain channel estimate for the first slot and the frequency-domain channel estimate for the second slot.

16. The apparatus according to claim 15, wherein the determining of the time-domain channel estimate for the first slot based on the frequency-domain channel estimate for the first slot and the frequency-domain channel estimate for the second slot comprises:
performing a transform on a frequency-domain channel estimate matrix formed by the frequency-domain channel estimate for the first slot and the frequency-domain channel estimate for the second slot, to obtain a first frequency-domain channel estimate matrix;
multiplying the first frequency-domain channel estimate matrix by a windowing matrix to obtain a second frequency-domain channel estimate matrix; and
performing an inverse transform on the second frequency-domain channel estimate matrix to obtain the time-domain channel estimate for the first slot.

17. The apparatus according to claim 15, wherein the determining of the time-domain channel estimate for the first slot based on the frequency-domain channel estimate for the first slot and the frequency-domain channel estimate for the second slot comprises:
multiplying the frequency-domain channel estimate for the first slot and the frequency-domain channel estimate for the second slot by corresponding filtering coefficients respectively, and sum up obtained products, to obtain the time-domain channel estimate for the first slot.

18. The apparatus according to claim 11, the operations further comprising:
performing, based on the time-domain channel estimate for the first slot, demodulation and decoding on a received signal corresponding to the first slot; and
when a bit error exists in the received signal that has been demodulated and decoded, sending bit error information to a transmit end, wherein the transmit end increases a quantity of retransmissions based on the bit error information.

19. The apparatus according to claim 11, wherein the first channel estimate for the first slot comprises a frequency-domain channel estimate for the first slot, and
wherein the operations further comprise:
performing, based on the frequency-domain channel estimate for the first slot, demodulation and decoding on a received signal corresponding to the first slot, to obtain a first check code;
performing, based on the time-domain channel estimate for the first slot, demodulation and decoding on the received signal corresponding to the first slot, to obtain a second check code; and
determining, as an actual received signal, a decoded signal corresponding to a check code that is in the first check code and the second check code and that meets a preset condition.

20. A non-transitory computer readable medium, wherein the non-transitory computer readable medium stores instructions, which, when executed by a computer, cause the computer to perform operations comprising:
- determining a first slot and at least one second slot, wherein the first slot and the second slot form continuous slots;
- separately obtaining a first signal corresponding to the first slot and a second signal corresponding to the second slot, wherein the first signal and the second signal each comprise a pilot signal;
- determining a first channel estimate for the first slot based on the pilot signal in the first signal, and determining a second channel estimate for the second slot based on the pilot signal in the second signal; and
- determining a time-domain channel estimate for the first slot based on the first channel estimate for the first slot and the second channel estimate for the second slot.

\* \* \* \* \*